United States Patent [19]

Isomura et al.

[11] Patent Number: 4,574,761
[45] Date of Patent: Mar. 11, 1986

[54] ELECTRONIC FUEL INJECTION CONTROL SYSTEM FOR INTERNAL COMBUSTION ENGINE

[75] Inventors: Shigenori Isomura; Toshio Kondo; Akio Kobayashi; Takehiro Kikuchi, all of Kariya, Japan

[73] Assignee: Nippondenso Co., Ltd., Kariya, Japan

[21] Appl. No.: 680,046

[22] Filed: Dec. 10, 1984

[30] Foreign Application Priority Data

Dec. 8, 1983 [JP] Japan .............................. 58-231866

[51] Int. Cl.$^4$ .......................................... F02D 41/00
[52] U.S. Cl. ................................. 123/478; 123/487; 123/486; 123/480
[58] Field of Search ............... 123/478, 487, 486, 480, 123/492, 493

[56] References Cited

U.S. PATENT DOCUMENTS

| | | | |
|---|---|---|---|
| 3,750,631 | 8/1973 | Scholl et al. | 123/478 |
| 4,069,795 | 1/1978 | Long et al. | 123/487 |
| 4,309,759 | 1/1982 | Tokuda et al. | 123/487 |
| 4,359,992 | 11/1982 | Asano et al. | 123/487 |
| 4,380,800 | 4/1983 | Wilkenson | 123/487 |
| 4,450,814 | 5/1984 | Sawamoto et al. | 123/478 |
| 4,478,190 | 10/1984 | Kawai | 123/478 |
| 4,480,620 | 11/1984 | Tonge et al. | 123/478 |
| 4,492,203 | 1/1985 | Yutaka | 123/478 |
| 4,495,921 | 1/1985 | Sawamoto | 123/480 |

Primary Examiner—Raymond A. Nelli
Attorney, Agent, or Firm—Cushman, Darby & Cushman

[57] ABSTRACT

In an electronic fuel injection control system for an internal combustion engine, a first integration circuit is responsive to an angular signal with a time period in inverse proportion to the rotational speed of the engine for integrating the first half of the time period of the angular signal and for producing a first integration signal indicative of a resultant value of the integration, a hold circuit is arranged to hold the value of the first integration signal upon lapse of the first half of the time period and to produce a hold signal of the held value and maintain it for the second half of the time period and the first half of the time period of the following angular signal, a second integration circuit is responsive to the angular signal for integrating the value of an air quantity signal indicative of the quantity of air drawn into the engine at each start of the first and second halves of the time period and for producing a second integration signal indicative of a resultant value of the integration of the value of the air quantity signal, and a signal generator is arranged to determine a fuel injection time based on the time required for arrival of the valve of the second integration signal to the level of the hold signal after each start of the first and second halves of the time period.

7 Claims, 4 Drawing Figures

ELECTRONIC FUEL INJECTION CONTROL SYSTEM FOR INTERNAL COMBUSTION ENGINE

BACKGROUND OF THE INVENTION

The present invention relates to an electronic fuel injection control system for internal combustion engines, and more particularly to a calculation unit for use in the control system for determining an optimum fuel injection time in relation to the quantity of air drawn into the engine.

In one example of such a conventional fuel injection control system as disclosed in the U.S. Pat. No. 3,750,631 issued on Aug. 7, 1973, the position of a static plate used to measure the amount of air sucked through the intake manifold controls the wiper of a potentiometer that is connected to control either the rate of charging or of discharging of a single capacitor that is charged in synchronism with the rotation of the engine crankshaft. The length of time that the capacitor takes to discharge determines the length of time that the fuel injection valve is open. Although such a fuel injection control system is suitable for determining the fuel injection time in synchronism with the rotational period of the engine, it is disabled to vary the timing for determination of the fuel injection time in response to operating conditions of the engine or to independently determine the fuel injection time for each cylinder of the engine.

SUMMARY OF THE INVENTION

It is, therefore, a primary object of the present invention to provide an electronic fuel injection control system capable of independently determining an optimum fuel injection time in relation to the quantity of air for each cylinder of the engine and alternatively capable of determining the optimum fuel injection time in sychronism with the rotational period of the engine.

According to the present invention, there is provided an electronic fuel injection control system for an internal combustion engine which comprises first detecting means for detecting a predetermined rotational angle of the engine crankshaft and for producing an angular signal with a time period in inverse proportion to the rotational speed of the engine, second detecting means for detecting the quantity of air drawn into the engine and for producing an air quantity signal indicative of the detected air quantity, first integration means responsive to the angular signal for integrating the first half of the time period of the angular signal and for producing a first integration signal indicative of a resultant value of the integration, hold means for holding the value of the first integration signal upon lapse of the first half of the time period and for producing a hold signal of the holded value during the second half of the time period and the first half of the time period of the following angular signal, second integration means responsive to the angular signal for integrating the value of the air quantity signal at each start of the first and second halves of the time period of the angular signal and for producing a second integration signal indicative of a resultant value of the integration of the value of the air quantity signal, and means for determining a fuel injection time based on the time required for arrival of the value of the second integration signal to the level of the hold signal after each start of the first and second halves of the time period of the angular signal.

Preferably, the first detecting means comprises a rotational angle sensor arranged to detect a predetermined rotational angle of the engine crankshaft for producing an angular signal with a time period in inverse proportion to the rotational speed of the engine, and a frequency divider for dividing the frequency of the angular signal to produce a divided signal therefrom. The first integration means may comprise a switch means arranged to be normally open and to be closed in response to the divided signal from the frequency divider, a capacitor to be charged with a constant current under the opening of the switch means and to be discharged in response to the closing of the switch means, and an operational amplifier for integrating the charged voltage of the capacitor and for producing an integrated voltage therefrom, and the hold means may comprise a second switch means arranged to be normally closed and to be opened in response to the divided signal from the frequency divider, a second capacitor to be charged with the integrated voltage under the closing of the second switch means, and an operational amplifier for holding the charged voltage of the second capacitor and maintaining it until the second switch means is opened. Furthermore, the second integration means may comprise a switch means arranged to be normally open and to be closed in response to the angular signal, a capacitor to be charged with a constant current in accordance with the value of the air quantity signal under the opening of the switch means and to be discharged in response to the closing of the switch means, and the means for determining the fuel injection time may comprises a comparator for comparing the value of the second integration signal with the level of the hold signal to produce a high level signal when the value of the second integration signal reaches the level of the hold signal, and means for determining a fuel injection time in response to the high level signal from the comparator after each start of the first and second halves of the time period of the angular signal.

BRIEF DESCRIPTION OF THE DRAWINGS

Additional objects, features and advantages of the present invention will become more readily apparent from the following detailed description of a preferred embodiment thereof when considered with reference to the attached drawings, in which.

DETAILED DESCRIPTION OF THE PREFERRED EMBODIMENT

Figure 1:
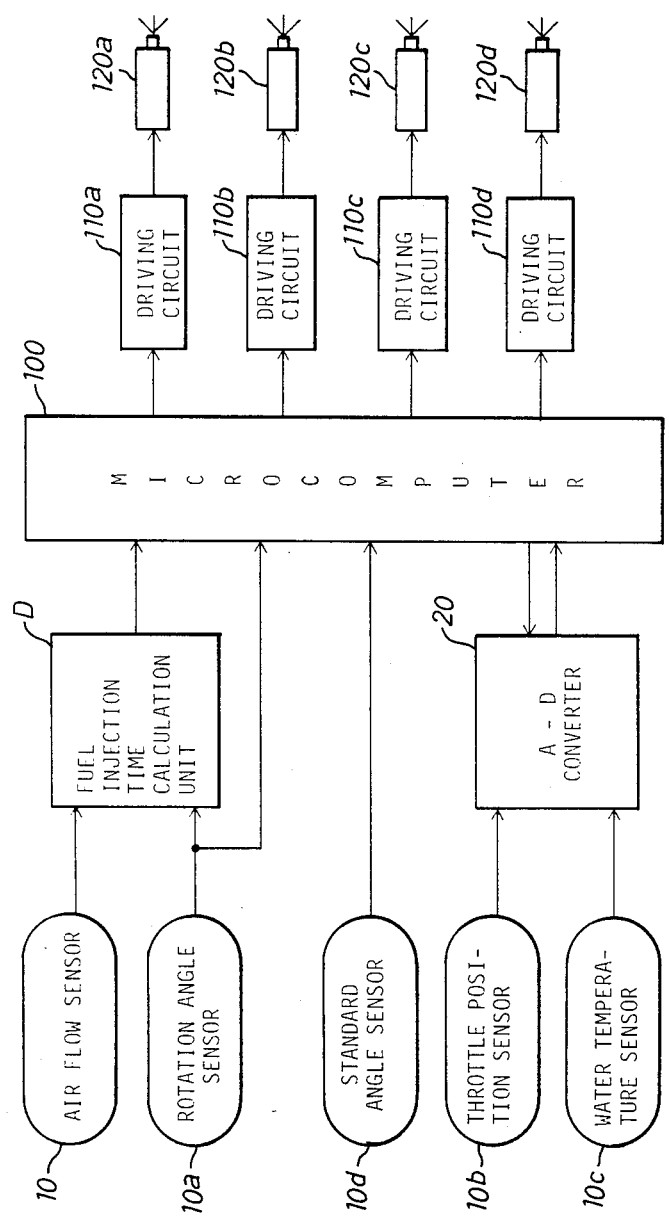
FIG. 1 is a schematic illustration of an electronic fuel injection control system in accordance with the present invention.
Figure 2:
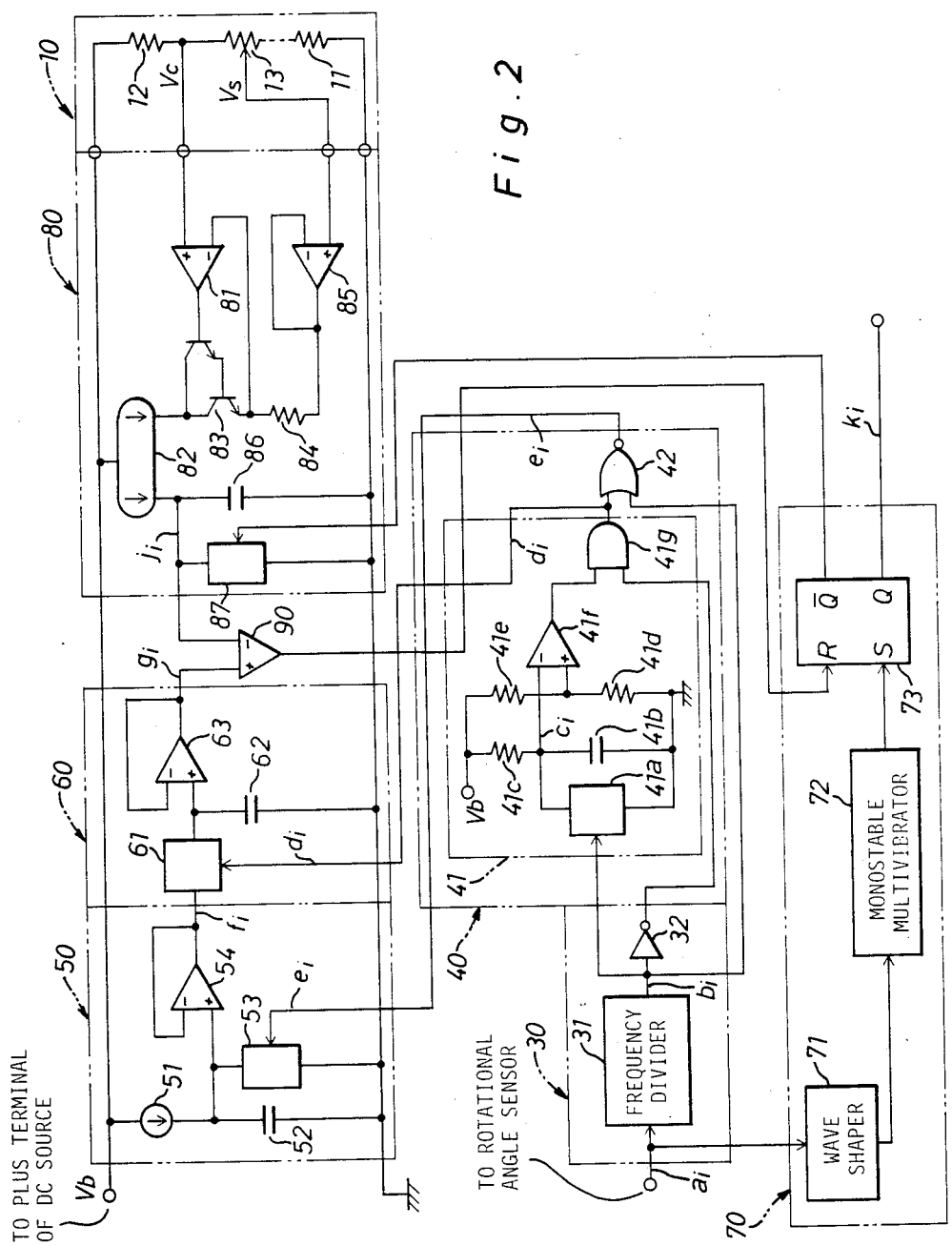
FIG. 2 is a circuit diagram of a fuel injection time calculation unit adapted to the control system of FIG. 1.

Referring now to the drawings, there is schematically illustrated, in FIG. 1, an electronic fuel injection control system for a four cylinder, four stroke, internal combustion engine to which the present invention is adapted. The electronic fuel injection control system includes a fuel injection time calculation unit D in connection to an air flow sensor 10 and a rotational angle sensor 10a, and an analog-to-digital converter 20 (hereinafter simply called A-D converter) in connection to a throttle position sensor 10b and a water temperaure sensor 10c. As is illustrated in FIG. 2, the air flow sensor 10 comprises a variable resistor 11 which is grounded at one end thereof and connected at the other end thereof to a positive terminal of a DC source through a resistor 12. The variable resistor 11 cooperates with the resistor 12 to convert a supply voltage $V_b$ from the DC source into a divided voltage $V_c$ which appears at a common terminal between resistors 11 and 12. The air flow sensor 10 includes a movable tap 13 which is arranged to slide on the resistor 11 in proportion to the quantity of air drawn into the engine thereby to produce a voltage $V_s$ with a level proportional to the quantity of air. This means that a difference between voltages $V_c$ and $V_s$ is in inverse proportion to the quantity of air drawn into the engine.

The rotational angle sensor 10a is arranged to detect a rotational angle of a crankshaft of the engine at each angle of 180 so as to successively produce a series of angular signals $a_i$ ($i = 1, 2, \ldots$) as a result of the detection. (see FIG. 3) In this case, the time period of the respective angular signals $a_i$ is in inverse proportion to the rotational speed N of the engine. The throttle position sensor 10b is arranged to detect the opening degree of a throttle valve in an induction pipe of the engine so as to produce an opening degree signal in analog form indicative of the opening degree of the throttle valve. The water temperature sensor 10c is arranged to detect a temperature of cooling water in the engine so as to produce a temperature signal in analog form indicative of the detect water temperature. The A-D converter 20 is arranged to convert the analog signals from sensors 10b and 10c into digital signals respectively indicative of the opening degree of the throttle valve and the temperature of cooling water. In necessity, various sensors for detecting operating conditions of the engine may be connected to the A-D converter 20.

As is illustrated in FIG. 2, the fuel injection time calculation unit D comprises a frequency divider circuit 30 in connection to the rotational angle sensor 10a, a signal generator 40 in connection to the frequency divider circuit 30, an integration circuit 50 in connection to the signal generator 40, and a hold circuit 60. In the frequency divider circuit 30, the frequency of respective angular signals $a_i$ is divided by a frequency divider 31 into one half, and a signal $b_i$ with the divided frequency is inverted by an inverter 32. (see FIG. 3) The frequency of signal $b_i$ corresponds with the frequency of rotational speed of the engine. The signal generator 40 includes a monostable mulitivibrator 41 in connection to the frequency divider 31, and a NOR gate 42 in connection to the frequency divider 31 and the monostable multivibrator 41. The monostable multivibrator 41 includes an analog switch 41a which is arranged to be closed in response to the leading edge of signal $b_i$ from frequency divider 31 and to be opened in response to the trailing edge of signal $b_i$. The monostable multivibrator 41 further includes a capacitor 41b in parallel connection to analog switch 41a, which capacitor 41b is charged with the supply voltage $V_b$ applied thereto through a resistor 41c in response to the opening of the analog switch 41a so as to produce a charged voltage $C_i$. The capacitor 41b is instantaneously discharged in response to closing of the analog switch 41a to extinguish the charged voltage $C_i$.

The monostable multivibrator 41 further includes a resistor 41d which cooperates with a resistor 41e to divide the supply voltage $V_b$ so as to produce the divided voltage as a standard voltage at a common terminal between resistors 41d and 41e. In this case, the standard voltage is determined at a relatively low level. A comparator 41f is arranged to produce a high level signal therefrom when the charged voltage $C_i$ from capacitor 41b is below the standard voltage from resistor 41d. When the charged voltage $C_i$ exceeds the standard voltage, the high level signal from comparator 41f disappears. An AND gate 41g is arranged to produce a gate signal $d_i$ therefrom when received the inverted signal from inverter 32 and the high level signal from comparator 41f. When one of the inverted signal and the high level signal from comparator 41f disappears, the gate signal $d_i$ from AND gate 41g will disappear. A NOR gate 42 is arranged to receive the gate signal $d_i$ and the divided signal $b_i$ respectively from AND gate 41g and frequency divider 31. Only when both the gate signal $d_i$ and divided signal $b_i$ are respectively maintained at a low level, the NOR gate 42 produces a gate signal $e_i$ at a high level.

The integration circuit 50 includes a constant current circuit 51 and a capacitor 52 connected in series with the constant current circuit 51, and an analog switch 53 connected in parallel to capacitor 52. The constant current circuit 51 receives the supply voltage $V_b$ to produce a constant current therefrom. The analog switch 53 closes in response to the gate signal $e_i$ from NOR gate 42 and opens when the gate signal $e_i$ disappears. The capacitor 52 is charged with the constant current from circuit 51 in response to the opening of analog switch 53 and is instantaneously discharged after the analog switch 53 has been closed. An operational amplifier 54 is responsive to rise of the charged voltage from capacitor 52 to proportionally integrate it with respect to a time thereby to produce an integrated voltage $f_i$. The integrated voltage $f_i$ will disappear immediately after the charged voltage from capacitor 52 has disappeared. In this case, the integration time in operational amplifier 54 corresponds with one half of the time period of the divided signal $b_i$ from frequency divider 31.

The hold circuit 60 includes an analog switch 61 and a capacitor 62 connected in series with each other. The analog switch 61 is arranged to close in response to the gate signal $d_i$ applied thereto from AND gate 41g and to open in response to disappearance of the gate signal $d_i$. While the analog switch 61 closes, the capacitor 62 is charged with a peak value $h_i$ of the integrated voltage $f_i$ applied thereto from operational amplifier 54 through analog switch 61. An operational amplifier 63 is arranged to produce a hold voltage $g_i$ in response to the charged voltage from capacitor 62, which hold voltage $g_i$ corresponds with the peak value $h_i$ of the integrated voltage $f_i$. (see FIG. 3)

The fuel injection time calculation unit D comprises a signal generator 70 connected to the rotational angle sensor 10a, an integration circuit 80 connected to the signal generator 70 and the air flow sensor 10, and a comparator 90 connected to the signal generator 70 and the integration circuit 80. The signal generator 70 includes a wave shaper 71 which is arranged to successively reshape the angular signals $a_i$ from sensor 10a to produce a series of reshaped signals. The signal generator 70 further includes a monostable multivibrator 72 which produces a high level signal therefrom in response to the respective reshaped signals from wave shaper 71. In this case, the generation time of the high level signal from monostable multivibrator 72 is determined as short as possible in comparison with the time period of the angular signal $a_i$ from sensor 10a. An RS flip-flop 73 is responsive to the high level signal from monostable multivibrator 72 to produce low and high level signals respectively from its output terminals $\overline{Q}$ and Q. As will be described later, the RS flip-flop 73 is further responsive to a low level signal from the comparator 90 to produce high and low level signals respectively from its output terminals $\overline{Q}$ and Q.

The integration circuit 80 includes a Darlington circuit 83 connected to a buffer 81 and a Miller inversion circuit 82, a resistor 84 connected to the Miller inversion circuit 82 through the Darlington circuit 82, and an operational amplifier 85 connected between the resistor 84 and the air flow sensor 10. The Darlington circuit 83 includes a pair of transistors which energizes in response to the divided voltage $V_c$ from sensor 10 under control of the buffer 81. The Miller inversion circuit 82 is applied with the supply voltage $V_b$ from the DC source to produce a constant current during energization of the transistors of the Darlington circuit 83. The constant current from circuit 82 is applied to the resistor 84 and a capacitor 86. The operational amplifier 85 amplifies the detected voltage $V_s$ from sensor 10 in such a way to render the value of the constant current applied to resistor 84 proportional to a difference between the divided voltage $V_c$ and the detected voltage $V_s$. The difference corresponds with the reciprocal of the quantity of air flow sucked into the engine.

The capacitor 86 is connected in parallel to an analog switch 87 which is closed in response to the high level signal from the output terminal $\overline{Q}$ of RS flip-flop 73 and is opened in response to the low level signal from the output terminal $\overline{Q}$ of RS flip-flop 73. The capacitor 86 is applied with the constant current from Miller inversion circuit 82 in response to the opening of analog switch 87 to produce a charged voltage $j_i$. (see FIG. 3) The voltage charged in capacitor 86 is instantaneously discharged in response to the closing of analog switch 87. The charge speed of the voltage $j_i$ is defined by the constant current from Miller inversion circuit 82, namely the detected voltage $V_s$ from sensor 10. The Miller inversion circuit 82 is connected to a comparator 90 which produces a high level signal therefrom when the charged voltage $j_i$ is below the level of the hold signal $g_i$ from operational amplifier 63. The high level signal from comparator 90 is applied to the RS flip-flop 73 and disappears in response to coincidence of the charged voltage $j_i$ and the level of the hold signal $g_i$. This means that the high level signal from the output terminal Q of RS flip-flop 73 is generated as an injection width signal $k_i$ of which the width is proportional to the quantity q of sucked air in relation to the rotational speed N of the engine. In other words, the width of injection width signal $k_i$ essentially corresponds with a standard fuel injection time.

As is illustrated in FIG. 1, the electronic fuel injection control system comprises a microcomputer 100 which is connected to the fuel injection time calculation unit D, the rotational angle sensor 10a, a standard angle sensor 10d, and the A-D converter 20. In this arrangement, the standard angle sensor 10d acts to detect an angle of the engine crankshaft which corresponds with the top dead centre of a piston in a cylinder of the engine and to produce a standard angle signal indicative of the detected angle. The microcomputer 100 cooperates with the calculation unit D, the rotational angle sensor 10a, the standard angle sensor 10d and the A-D converter 20 to repetitively execute a computer program based on a flow chart of FIG. 4 thereby to determine various values required for control of driving circuits 110a, 110b, 110c and 110d respectively connected to electrically operated fuel injectors 120a, 120b, 120c and 120d of the engine. The fuel injectors 120a, 120b, 120c and 120d correspond with the first, second, third and fourth cylinders of the engine, respectively.

OPERATION

Figure 3:
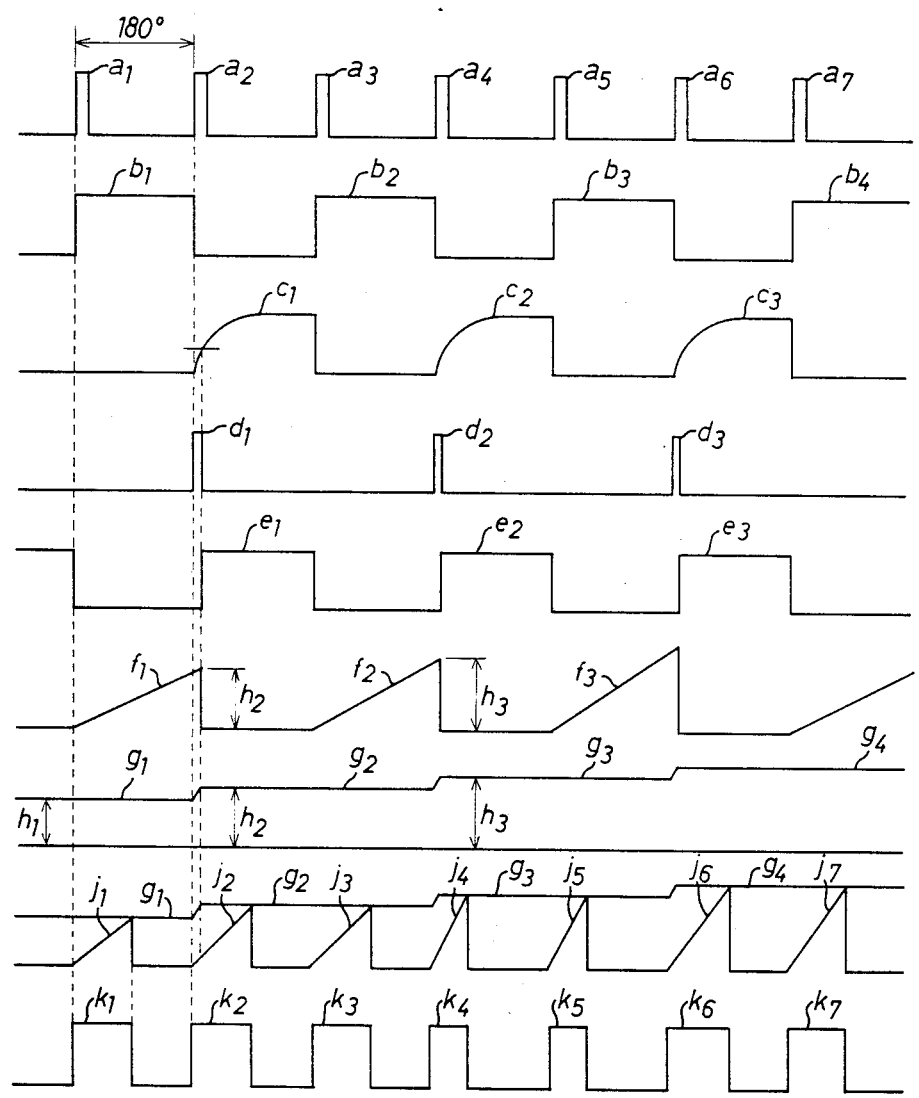
FIG. 3 is a graph illustrating output wave forms at respective points in the circuit diagram of FIG. 2.
Figure 4:
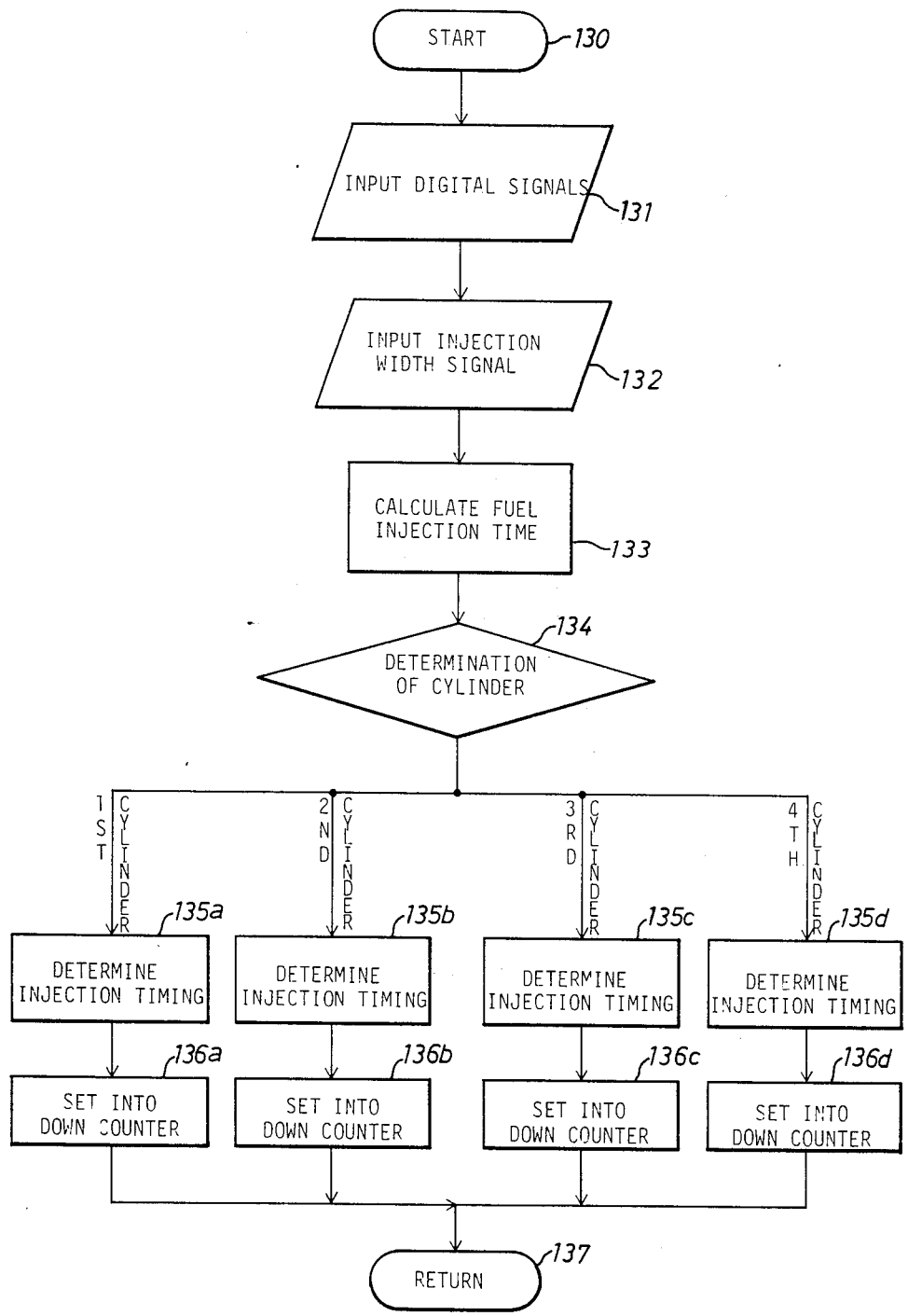
FIG. 4 is a flow chart illustrating a program for a microcomputer of the control system.

When the electronic fuel injection control system is activated in response to start of the engine, the computer 100 initiates execution of the program at a step 130 in the flow chart of FIG. 4, and the A-D converter 20 cooperates with the throttle position sensor 10b, the water temperature sensor 10c and the other sensors to produce digital signals respectively indicative of the opening degree of the engine throttle, the temperature of cooling water and the like. At this stage, as is illustrated in FIG. 3, the rotational angle sensor 10a produces an angular signal $a_1$, the frequency divider 30 produces a divided signal $b_1$ and its inverted signal, and the monostable multivibrator 72 of signal generator 70 produces a high level signal in response to the angular signal $a_1$ to apply it to the RS flip-flop 73. Then, the RS flip-flop 73 produces low and high level signals respectively from its output terminals $\overline{Q}$ and Q. Under such a condition, the signal generator 40 does not produce any gate signal $e_i$, and the analog switch 53 remains in its open position. Thus, the capacitor 52 is charged by cooperation with the constant current circuit 51, and the operational amplifier 54 acts to integrate the charged voltage of capacitor 52 so as to produce an integrated voltage $f_1$.

Simultaneously, the resistor 84 in integration circuit 80 is applied with the constant voltage from Miller inversion circuit 82 under the conductive state of Darlington circuit 83, and the operational amplifier 85 acts to amplify the constant voltage in accordance with the detected voltage $V_s$ from sensor 10 in such a manner that the constant voltage becomes proportional to a difference between the divided voltage $V_c$ and the detected voltage $V_s$. Meanwhile, the analog switch 87 still remains in its open position due to the low level signal from the output terminal $\overline{Q}$ of RS flip-flop 73, and the capacitor 86 is charged with the constant current from Miller inversion circuit 82. When the charged voltage $j_1$ of capacitor 86 reaches the level of a hold signal $g_1$ from hold circuit 60, the high level signal from comparator 90 disappears to cause inversion of the low and high level signals from the output terminals $\overline{Q}$ and Q of RS flip-flop 73. This means that the high level signal from the output terminal Q of RS flip-flop 73 is produced as an injection width signal $k_1$ of which the width corresponds with the lapse of time defined by appearance of the angular signal $a_1$ and disappearance of the high level signal from comparator 90. The width of the injection width signal $k_1$ also corresponds with the standard injection time of fuel which is proportional to the quantity Q of air drawn into the engine upon appearance of the angular signal $a_1$ in relation to the rotational speed of the engine corresponding to the time period of the angular signal $a_1$.

When the computer program proceeds to a step 131 in the flow chart of FIG. 4, the computer 100 is applied with the digital signals respectively indicative of the opening degree of the engine throttle, the temperature of cooling water and the like, and is subsequently applied with the injection width signal $k_1$ from RS flip-flop 73 at the following step 132 of the program. When the program proceeds to a step 133, the computer 100 determines an optimum injection time in dependence upon the width of injection width signal $k_1$ related to each value of the digital signals. At a step 134 of the program, the computer 100 determines a cylinder of the engine based on the angular signal $a_1$ from rotational angle sensor 10a in relation to the standard angle signal from sensor 10d.

Assuming that the first cylinder of the engine is determined at step 134, the program proceeds to a step 135a where the computer 100 determines an injection timing of the first cylinder. At the following step 136a, the computer 100 sets the optimum injection time in its down counter in relation to the injection timing. Thus, the down counter of computer 100 starts to count down the optimum injection time and to produce an output signal therefrom during the counting down operation. In response to the output signal from computer 100, the driving circuit 110a is activated to operate the injector 120a to supply an optimum amount of fuel from the fuel supply source into the first cylinder of the engine. Upon completion of the counting down operation, the output signal from computer 100 disappears to deactivate the driving circuit 110a to cause stop of the fuel injection into the first cylinder of the engine.

When the rotational angle sensor 10a produces an angular signal $a_2$, the divided signal $b_1$ drops at the leading edge of angular signal $a_2$, and its inverted signal becomes a high level signal. Simultaneously, the monostable multivibrator 72 produces a high level signal, and the RS flip-flop 73 produces low and high level signals respectively from its output terminals $\overline{Q}$ and Q. Thus, the analog switch 41a of monostable multivibrator 41 opens in response to the drop of divided signal $b_1$, and the capacitor 41b is charged in response to the opening of analog switch 41a to produce a charged voltage $C_1$. Subsequently, the comparator 41f of monostable multivibrator 41 produces an output signal therefrom in response to increase of the charged voltage $C_1$ and the reference voltage from resistor 41d, and the AND gate 41g produces a gate signal $d_1$ therefrom in response to the rise of the inverted signal from inverter 32 and the output signal from comparator 41f. When the analog switch 61 is temporarily closed in response to the gate signal $d_1$, the hold circuit 60 acts to hold a peak value $h_2$ of the integrated signal $f_1$ from integration circuit 50 and to produce a hold signal $g_2$ therefrom. In this instance, the integrated signal $f_1$ disappears immediately after the analog switch 53 is closed in response to a gate signal $e_1$ from NOR gate 42 responsive to the gate signal $d_1$ from AND gate 41g. Meanwhile, the capacitor 86 of integration circuit 80 produces a charged voltage $j_2$ in the same manner as described above.

When the charged voltage $j_2$ from capacitor 86 reaches the level of hold signal $g_2$ from hold circuit 60, the high level signal from comparator 90 disappears to cause inversion of the low and high level signals respectively from the output terminals $\overline{Q}$ and Q of RS flip-flop 73. As a result, the high level signal from the output terminal Q of RS flip-flop 73 is produced as an injection width signal $k_2$ of which the width corresponds with the lapse of time defined by appearance of the angular signal $a_2$ and disappearance of the high level signal from comparator 90. The width of injection width signal $k_2$ also corresponds with the standard injection time of fuel proportional to the quantity of air q drawn into engine responsive to the angular signal $a_2$ in relation to the rotational speed N of the engine.

Thus, the computer 100 acts to receive the injection width signal $k_2$ at step 132 of the program and to determine an optimum fuel injection time based on the width of signal $k_2$ related to each value of the digital signals entered at step 131. Subsequently, the computer 100 determines at step 134 of the program the second cylinder of the engine related to the angular signal $a_2$ in the same manner as described above and determines the fuel injection timing for the second cylinder. At the following step 136b, the computer 100 sets the optimum injection time in its down counter in relation to the fuel injection timing. Thus, the down counter of computer 100 starts to count down the optimum injection time and to produce an output signal during the counting down operation. In response to the output signal from computer 100, the driving circuit 110b is activated to operate the injector 120b to supply an optimum amount of fuel from the fuel supply source into the second cylinder of the engine. When the counting down operation is completed, the output signal from computer 100 disappears to deactivate the driving circuit 110b.

When the rotational angle sensor 10a produces an angular signal $a_3$, the frequency divider 30 procudes a divided signal $b_2$ and its inverted signal, and the RS flip-flop 73 cooperates with the monostable multivibrator 72 to produce low and high level signals respectively from its output terminals $\overline{Q}$ and Q. In this instance, the gate signal $e_1$ from NOR gate 42 disappears in response to the divided signal $b_2$ to open the analog switch 53, and the integration circuit 50 produces an integrated voltage $f_2$ from its operational amplifier 54. Meanwhile, the capacitor 86 of integration circuit 80 produces a charged voltage $j_3$ therefrom in the same manner as described above. When the charged voltage $j_3$ reaches the level of hold signal $g_2$ from hold circuit 60, the high level signal from comparator 90 disappears to cause inversion of the low and high level signals respectively from the output terminals $\overline{Q}$ and Q of RS flip-flop 73. Thus, the high level signal from the output terminal Q of RS flip-flop 73 is produced as an injection width signal $k_3$ of which the width corresponds with the lapse of time defined by appearance of the angular signal $a_3$ and disappearance of the high level signal from comparator 90. The width of injection width signal $k_3$ also corresponds with the standard fuel injection time proportional to the quantity of air drawn into the engine responsive to the angular signal $a_3$ in relation to the rotational speed of the engine.

Thus, the computer 100 acts to receive the injection width signal $k_3$ at step 132 of the program and to determine an optimum fuel injection time based on the width of signal $k_3$ related to each value of the digital signals entered at step 131. Subsequently, the computer 100 determines at step 134 of the program the third cylinder of the engine related to the angular signal $a_3$ in the same manner as described above and determines the fuel injection timing for the third cylinder. At the following step 136b, the computer 100 sets the optimum injection time in its down counter in relation to the fuel injection timing. Thus, the down counter of computer 100 starts to count down the optimum injection time and to produce an output signal during the counting down operation. In response to the output signal from computer 100, the driving circuit 110c is activated to operate the injector 120c to supply an optimum amount of fuel from the fuel supply source into the third cylinder of the engine. When the counting down operation is completed, the output signal from computer 100 disappears to deactivate the driving circuit 110c. Thereafter, the above-described operation will be repetitively conducted in response to each angular signal from the rotational angle sensor 10a. In FIG. 4, steps 135d and 136d of the program are adapted to execution of the computer 100 for the fourth cylinder of the engine.

Although in the above embodiment the signal generator 70 is arranged to produce the injection width signal $k_i$ in response to the high level signal from monostable multivibrator 72, it may be arranged to adjust the timing for production of the injection width signal $k_i$ in accordance with the opening degree of the engine throttle, the temperature of cooling water, the intake manifold pressure and the like. In such arrangement, it is able to provide control of the standard fuel injection time in accordance with operating conditions of the engine. In the actual practices of the present invention, the rotational angle sensor 10a is arranged to produce the angular signal $a_i$ at an appropriate angle suitable for the number of cylinders of engine.

It is to be appreciated that various modifications can be made within the spirit of the present invention without departing therefrom. It is contemplated that minor modifications of the specific embodiment can be made and it is intended that the appended claims be read as including such modifications which do not depart from the inventive concept.

What is claimed is:

1. An electronic fuel injection control system for an internal combustion engine, comprising;
   first detecting means for detecting a predetermined rotational angle of the engine crankshaft and for producing an angular signal with a time period in inverse proportion to the rotational speed of the engine;
   second detecting means for detecting the quantity of air drawn into the engine and for producing an air quantity signal indicative of the detected air quantity;
   first integration means responsive to said angular signal for integrating the first half of the time period of said angular signal and for producing a first integration signal indicative of a resultant value of the integration;
   hold means for holding the value of said first integration signal upon lapse of the first half of said time period and for producing a hold signal of the hold value and maintaining it for the second half of said time period and the first half of the time period of the following angular signal;
   second integration means responsive to said angular signal for integrating the value of said air quantity signal at each start of the first and second halves of said time period and for producing a second integration signal indicative of a resultant value of the integration of the value of said air quantity signal; and
   means for determining a fuel injection time based on the time required for arrival of the value of said second integration signal to the level of said hold signal after each start of the first and second halves of said time period.

2. An electronic fuel injection control system according to claim 1, wherein said first detecting means comprises a rotational angle sensor arranged to detect a predetermined rotational angle of the engine crankshaft for producing an angular signal with a time period in inverse proportion to the rotational speed of the engine, and a frequency divider for dividing the frequency of said angular signal to produce a divided signal therefrom.

3. An electronic fuel injection control system according to claim 2, wherein said rotational angle sensor is arranged to detect a plurality of predetermined angles of the engine crankshaft for successively producing a series of angular signals each with a time period in inverse proportion to the rotational speed of the engine, and said frequency divider is arranged to divide each frequency of said angular signals to produce a series of divided signals therefrom.

4. An electronic fuel injection control system according to claim 2, wherein said first integration means comprises a switch means arranged to be normally open and to be closed in response to said divided signal from said frequency divider, a capacitor to be charged with a constant current under the opening of said switch means and to be discharged in response to the closing of said switch means, and an operational amplifier for integrating the charged voltage of said capacitor and for producing an integrated voltage therefrom.

5. An electronic fuel injection control system according to claim 4, wherein said hold means comprises a second switch means arranged to be normally closed and to be opened in response to the divided signal from said frequency divider, a second capacitor to be charged with the integrated voltage from said operational amplifier under the closing of said second switch means, and an operational amplifier for holding the charged voltage of said second capacitor and maintaining it until said second switch means is opened.

6. An electronic fuel injection control system according to claim 1, wherein said second integration means comprises a switch means arranged to be normally open and to be closed in response to said angular signal, a capacitor to be charged with a constant current in accordance with the value of said air quantity signal under the opening of said switch means and to be discharged in response to the closing of said switch means.

7. An electronic fuel injection control system according to claim 1, wherein said means for determining the fuel injection time comprises a comparator for comparing the value of said second integration signal with the level of said hold signal to produce a high level signal therefrom when the value of said second integration signal reaches the level of said hold signal, and means for determining a fuel injection time in response to the high level signal from said comparator after each start of the first and second halves of said period time.

* * * * *